H. HEGELER & N. L. HEINZ.
PROCESS OF PURIFYING GASES CONTAINING SULFUR DIOXID.
APPLICATION FILED OCT. 14, 1907.
931,868.
Patented Aug. 24, 1909.
3 SHEETS—SHEET 1.
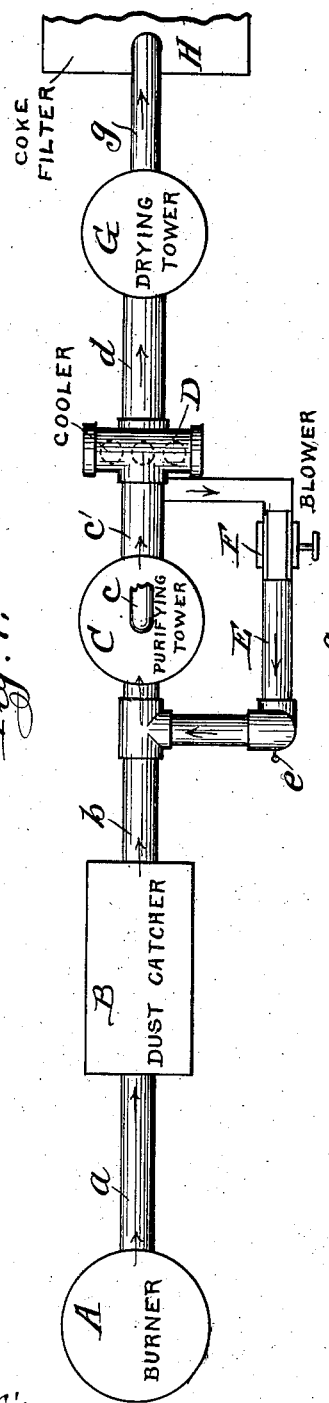
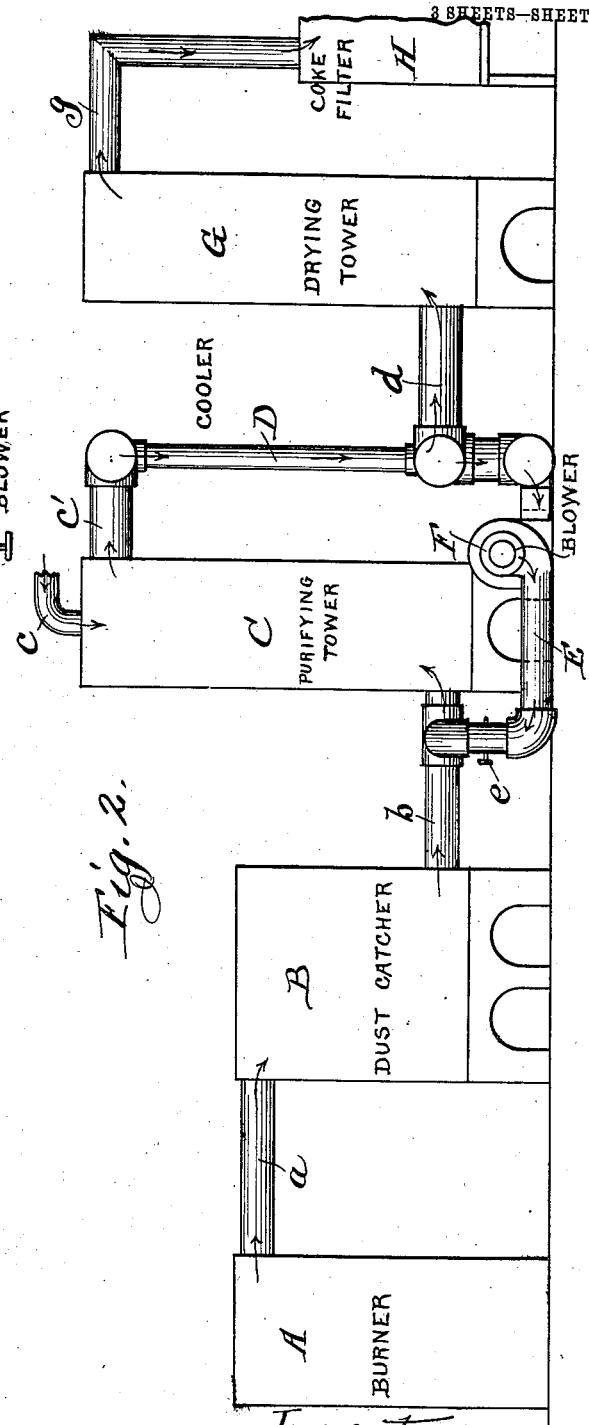

H. HEGELER & N. L. HEINZ.
PROCESS OF PURIFYING GASES CONTAINING SULFUR DIOXID.
APPLICATION FILED OCT. 14, 1907.
931,868.
Patented Aug. 24, 1909.
3 SHEETS—SHEET 2.
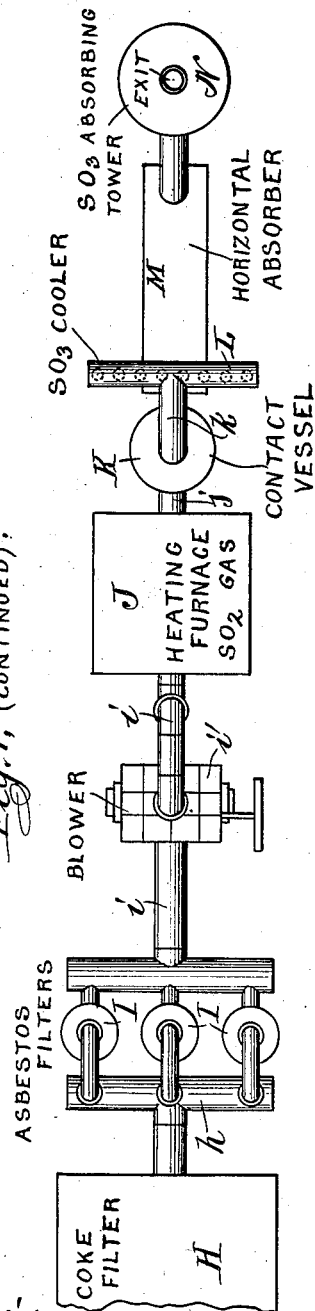
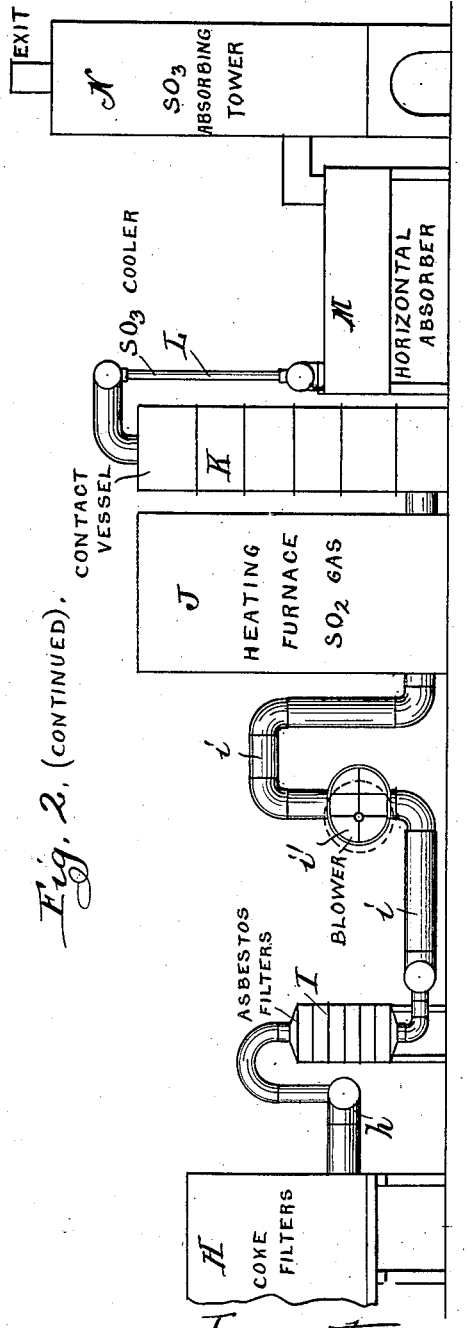

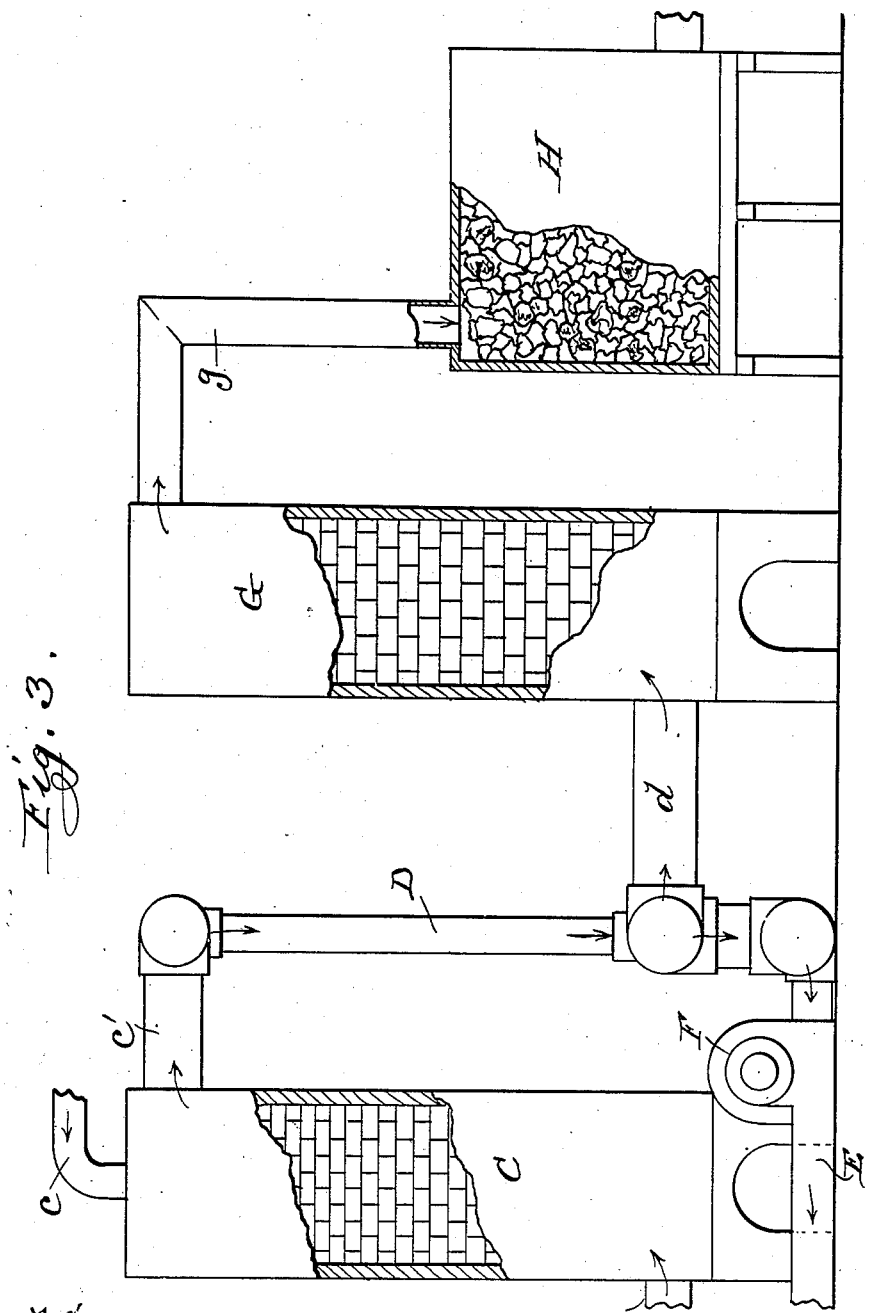

UNITED STATES PATENT OFFICE.

HERMAN HEGELER, OF DANVILLE, AND NICHOLAS L. HEINZ, OF LA SALLE, ILLINOIS.

PROCESS OF PURIFYING GASES CONTAINING SULFUR DIOXID.

931,868.

Specification of Letters Patent.    Patented Aug. 24, 1909.

Application filed October 14, 1907. Serial No. 397,294.

*To all whom it may concern:*

Be it known that we, HERMAN HEGELER, of Danville, in the county of Vermilion and State of Illinois, and NICHOLAS L. HEINZ, of La Salle, in the county of Lasalle and State of Illinois, have invented certain new and useful Improvements in the Processes of Purifying Gases Containing Sulfur Dioxid, of which the following is a specification.

Our invention relates to catalytic processes of making sulfuric acid in which a preliminary purifying process and a contact process are combined, whereby sulfurous gases as they come from a sulfur burner are first purified and then converted into acid, and it has for its object to provide a more expeditious and cheaper way of purifying the gases than any known to us which is adapted for use as the preliminary step in such combination. We attain this object by the operations hereinafter described and pointed out in the claims:

Our purifying process is adapted to be applied to the hot burner gases on their way from the burner to a contact vessel, and it consists, first, in cooling the hot gases down to a desired temperature by mixing therewith a sufficient quantity of cooled gases of about the same grade or strength; and, second, passing such mixture of hot and cooled gases upward through a filled purifying tower and therein subjecting said mixture to the resistance of the tower and to the action of finely divided streams of a cooled liquid trickling down in said tower. The liquid meant is water or preferably sulfuric acid and the desired temperature of the mixed gases is one which will not raise the temperature in the purifying tower above the boiling point of the liquid used. Whenever in the claims the term "water" is used, both or either of said liquids are meant.

The effect of the first operation is to reduce or regulate the temperature of the burner gases on their way to the purifying tower without diluting, condensing or oxidizing them, and of the second operation is to lower the temperature further to the point where the greatest precipitation of impurities carried by the gases occurs and to wash out or carry off all such precipitates.

The purification of the gases in the filled tower in this way is adapted to be used in conjunction with any of the well known ways of drying, filtering, and reheating the gases before subjecting them to catalytic action.

The accompanying drawings illustrate an apparatus which may be used for carrying our invention into effect. But the invention is independent of any particular means for its execution and any suitable apparatus may be used for that purpose.

In the drawings, Figure 1 represents diagrammatically a plan view of the apparatus, and Fig. 2 similarly, a view in side elevation. Fig. 3 is a fragmentary elevation with portions in section to show the interior structure.

Like letters of reference indicate like parts throughout the views.

In the drawings, A is the sulfur burner, $a$, a conduit leading therefrom and which conveys the hot burner gases ($SO_2$) into a suitable dust catcher B, wherein the larger portion of the dust settles, as in the ordinary way. This is provided with a conduit $b$ through which the gases pass on to and into a purifying tower C which is a filled tower having an ordinary tile filling as shown in Fig. 3 in which the gases meet resistance in passing the interstices around the filling. The tower C is provided at the top with a pipe $c$ through which cool water or sulfuric acid is introduced to trickle down through the interstices of the filling by which it is finely divided into small streams. Said tower also has a conduit $c'$ which leads to a surface cooler D into which it conveys the purified gases to be further cooled.

E is a conduit leading from the cooler D back to the conduit $b$ and provided with a damper $e$ and a blower F by means of which conduit, damper and blower a portion, more or less, of the gases passing the cooler D is taken, returned, and entered into and mixed with the current of gases flowing toward the tower C, sufficient to prevent the temperature in said tower from rising above the boiling point of the liquid trickling therein.

We prefer taking the cooled gases in the manner illustrated from a part of the apparatus coming after the purifying tower in the train, but a sufficient quantity of sufficiently cool $SO_2$ gases to cool the burner gases as required may be furnished from any other suitable source and be introduced into and mixed with the current of hot gases at any part in the train of the apparatus forward of the purifying tower and up to and including the sulfur burner with like effect. Therefore, we wish it understood the invention is not limited by the form or operation of the apparatus shown, to a particular source of supply of the cooled gases.

G is a filled drying tower and the $SO_2$ gases are finally conveyed by a conduit $d$ on in the general course to said drying tower and up through the finely divided dry interstices of the same, whereby all the moisture is absorbed and precipitated to the bottom of said tower. A conduit $g$ carries the gases on from the drier to a coke filter H, which is provided with a conduit $h$ whereby the gases from the coke filter are conveyed to an asbestos filter I. From the asbestos filter a flue $i$ leads to a heating furnace J. The flue has a blower $i'$ by means of which the filtered $SO_2$ gases are forced through the heating furnace.

K is a contact vessel into which the heated $SO_2$ gases pass through a conduit $j$. In this the $SO_2$ gases are converted into $SO_3$, and passed on through a conduit $k$ to an $SO_3$ cooler L whence it passes through a horizontal absorber M and on to and through a vertical $SO_3$ absorbing tower N.

The course of the gases throughout the entire train of apparatus is indicated by arrows marked on the drawings in the several conduits, towers or chambers, etc., through which the gases pass.

The drying, filtering and reheating of the gases are all well known operations in the manufacture of sulfuric acid as things to be preferred and it is contemplated that all or any of them may be used in conjunction with the characteristic operations of our present invention which consist more particularly in cooling the hot burner gases by mixing cool gases of about the same strength therewith and in subjecting the gases so cooled to the action of the trickling liquid in the purifying tower.

What we claim is:

1. In the process of purifying gas containing sulfur dioxid, the improvement which consists in, first mixing hot sulfurous gases from a burner with sufficient cooled burner gases of about equal sulfur dioxid content to produce the temperature desired; second, passing such mixture of gases upward through a filled purifying tower and subjecting the same to the resistance of said tower and to the action of finely divided streams of water trickling down through such tower.

2. In the process of purifying gases containing sulfur dioxid, the improvement which consists in; first, mixing hot sulfurous gases from a burner with sufficient cooled burner gases of about equal sulfur dioxid content to produce the temperature desired; second, passing such mixture of gases upward through a filled purifying tower, and subjecting the same to the action of finely divided streams of water trickling down through such tower, and; third, passing the gases upward through the dry interstices of a filled drying tower.

3. The process of purifying gases containing sulfur dioxid which consists, first, in mixing with hot gases from the burner sufficient cooled burner gases to produce a temperature of the mixed gases below that at which water boils; second, subjecting the mixed gases to the action of water trickling down through a filled tower; and third, drying and filtering the gases.

HERMAN HEGELER.
NICHOLAS L. HEINZ.

Witnesses to signature of Herman Hegeler:
CHARLES TROUP,
PARK S. DUFFIN.

Witnesses to signature of Nicholas L. Heinz:
E. R. COPE,
W. M. HEINZ.